(12) United States Patent
Azami

(10) Patent No.: US 9,923,239 B2
(45) Date of Patent: Mar. 20, 2018

(54) LITHIUM ION BATTERY

(75) Inventor: Takeshi Azami, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 62 days.

(21) Appl. No.: 14/118,288

(22) PCT Filed: May 15, 2012

(86) PCT No.: PCT/JP2012/062363
§ 371 (c)(1),
(2), (4) Date: Nov. 18, 2013

(87) PCT Pub. No.: WO2013/008525
PCT Pub. Date: Jan. 17, 2013

(65) Prior Publication Data
US 2014/0087249 A1    Mar. 27, 2014

(30) Foreign Application Priority Data
Jul. 14, 2011    (JP) ................. 2011-155737

(51) Int. Cl.
*H01M 10/0525* (2010.01)
*H01M 10/0567* (2010.01)
(Continued)

(52) U.S. Cl.
CPC ....... *H01M 10/0567* (2013.01); *H01M 4/133* (2013.01); *H01M 4/587* (2013.01);
(Continued)

(58) Field of Classification Search
None
See application file for complete search history.

(56) References Cited

U.S. PATENT DOCUMENTS 5,601,951 A * 2/1997 Johnson .............. H01M 4/0459
429/101
6,436,582 B1    8/2002 Hamamoto et al.
(Continued)

FOREIGN PATENT DOCUMENTS

EP    0634805 A1 * 1/1995 ............ H01M 4/583
JP    11-154513 A    6/1999
(Continued)

OTHER PUBLICATIONS

STN STIC Search—Record Attached.*
International Search Report from PCT/JP2012/062363 dated Aug. 14, 2012.

*Primary Examiner* — Sarah A. Slifka
*Assistant Examiner* — Haroon S. Sheikh
(74) *Attorney, Agent, or Firm* — Sughrue Mion, PLLC

(57) ABSTRACT

The purpose of the present invention is to provide a lithium-ion battery that exhibits excellent long-term life properties, does not suffer from rapid capacity degradation, and exhibits excellent charging/discharging characteristics in low-temperature environments. The present invention is directed to a lithium ion battery comprising: a negative electrode which comprises a negative electrode active material containing at least one of a graphite and an amorphous carbon, conductive additives containing a graphite, and a binder; a nonaqueous electrolyte solution; and a positive electrode containing a positive electrode active material capable of occluding and releasing lithium. The negative electrode active material has a spherical or massive shape, the conductive additives have a platy shape, and a part of an edge surface of the conductive additives contacts a surface of the negative electrode active material. The nonaqueous electrolyte solution contains a solvent, and an additive which reductively decomposes at a voltage lower than a reduction voltage of the solvent.

10 Claims, 3 Drawing Sheets

(51) Int. Cl.
*H01M 4/133* (2010.01)
*H01M 4/587* (2010.01)
*H01M 4/62* (2006.01)
*H01M 4/02* (2006.01)

(52) U.S. Cl.
CPC ............ *H01M 4/621* (2013.01); *H01M 4/625* (2013.01); *H01M 10/0525* (2013.01); *H01M 2004/021* (2013.01); *Y02T 10/7011* (2013.01)

(56) References Cited

U.S. PATENT DOCUMENTS

| | | | |
|---|---|---|---|
| 2004/0043300 A1 | 3/2004 | Utsugi et al. | |
| 2004/0224232 A1* | 11/2004 | Yamaguchi | H01M 4/13 429/232 |
| 2013/0130128 A1* | 5/2013 | Okamoto | H01M 10/0567 429/338 |

FOREIGN PATENT DOCUMENTS

| | | |
|---|---|---|
| JP | 11-263612 A | 9/1999 |
| JP | 2000-003724 A | 1/2000 |
| JP | 2000-133304 A | 5/2000 |
| JP | 2000-226206 A | 8/2000 |
| JP | 2000-251884 A | 9/2000 |
| JP | 2001-126764 A | 5/2001 |
| JP | 2001-160417 A | 6/2001 |
| JP | 2002-033104 A | 1/2002 |
| JP | 2003-289432 A | 10/2003 |
| JP | 2004-111109 A | 4/2004 |
| JP | 2004-281368 A | 10/2004 |
| JP | 2005-142004 A | 6/2005 |
| JP | 2007-005293 A | 1/2007 |
| JP | 4033074 B2 | 1/2008 |
| JP | 2008-192488 A | 8/2008 |
| JP | 2008-251523 A | 10/2008 |
| JP | 2010-165542 A | 7/2010 |
| JP | 2010-170886 A | 8/2010 |
| JP | 2010-198922 A | 9/2010 |
| JP | 4577482 B2 | 11/2010 |
| WO | 2005/057713 A1 | 6/2005 |
| WO | 2005/057714 A1 | 6/2005 |
| WO | WO2012017999 A1 * | 2/2012 ........ H01M 10/0567 |

* cited by examiner

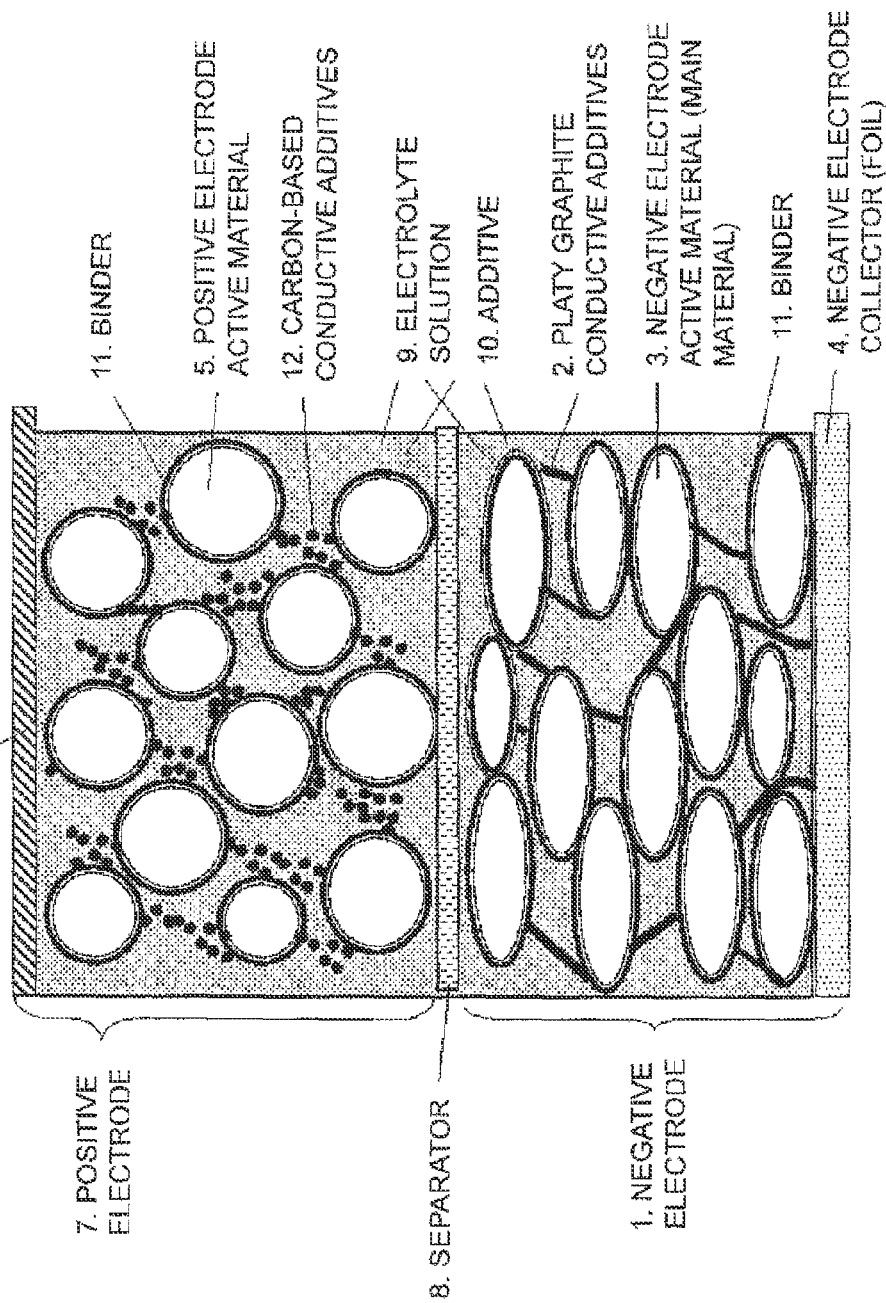

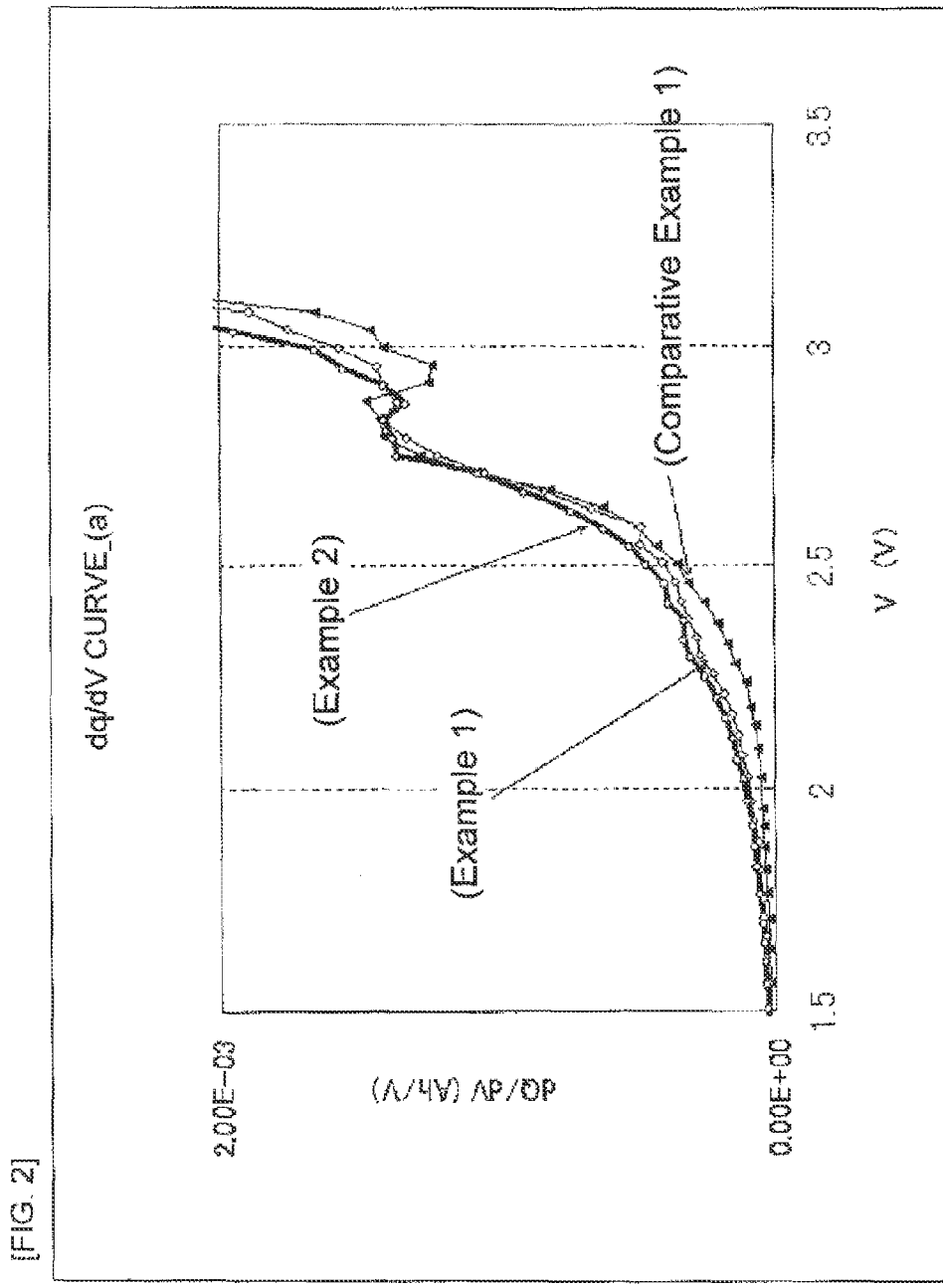

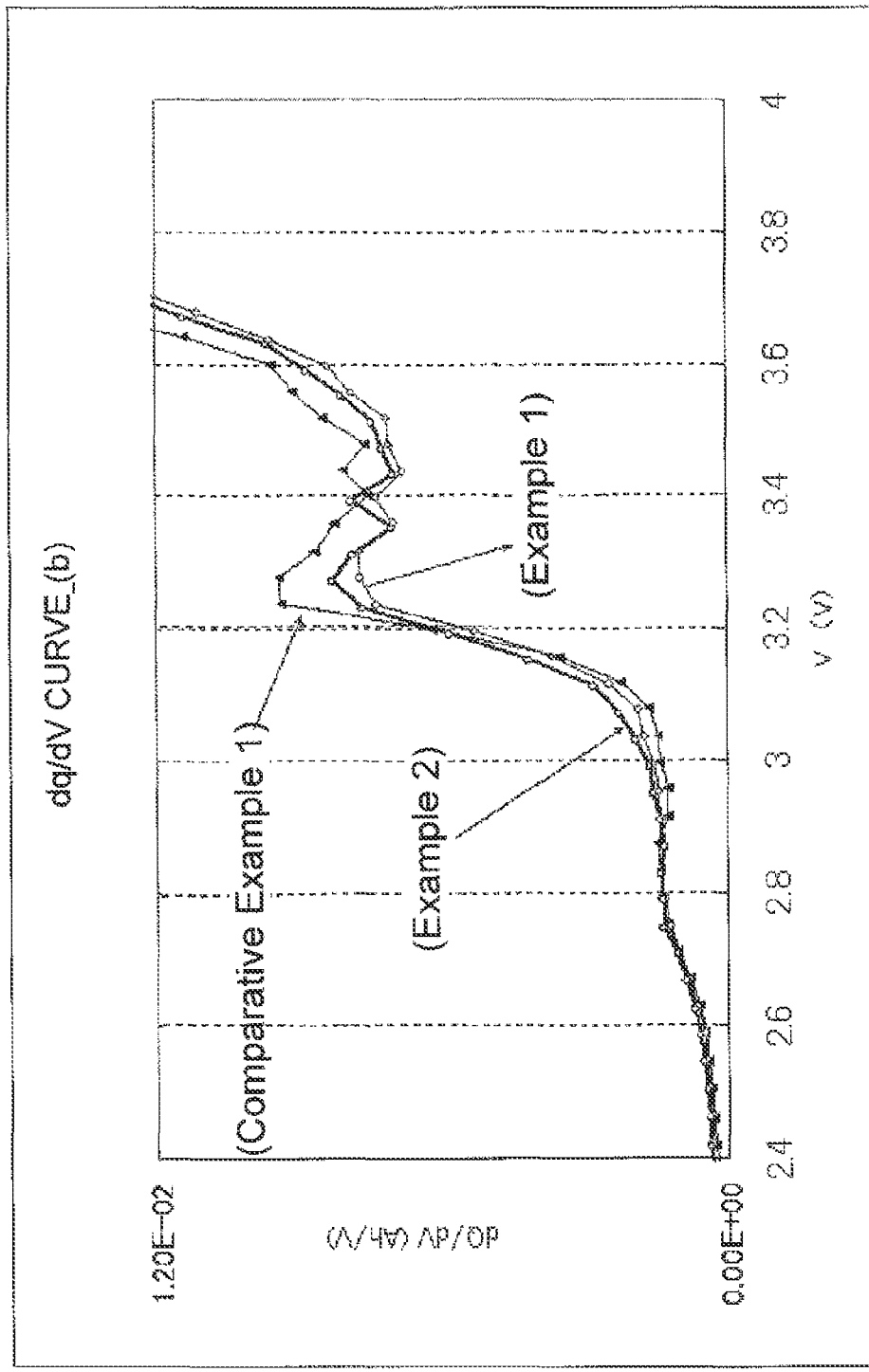

LITHIUM ION BATTERY

CROSS REFERENCE TO RELATED APPLICATIONS

This is a National Stage of International Application No. PCT/JP2012/062363 filed May 15, 2012, claiming priority based on Japanese Patent Application No. 2011-155737 filed Jul. 14, 2011, the contents of all of which are incorporated herein by reference in their entirety.

TECHNICAL FIELD

The present invention relates to a lithium ion battery.

BACKGROUND ART

Lithium ion secondary batteries are presently anticipated as a power source for electric vehicles (EVs) and hybrid electric vehicles (HEVs) due to growing consciousness to environmental problems in the worldwide scale. Additionally, for battery other than the above-mentioned vehicular applications, as batteries for large-scale power storage and power storage systems, and further high-capacity chargeable and dischargeable batteries in large-scale disasters, spread of lithium ion batteries using a large-sized laminate cell is anticipated. The large-sized lithium ion batteries are greatly different in the required life property from small-sized power sources for cell phones and mobile devices. Whereas the life property is about 3 years because small-sized power source applications have a fast product cycle, large-sized lithium ion batteries need to have the long-term life property over an at least 10- to 15-year period. Therefore, the life property of the large-sized lithium ion batteries is required to have a low capacity degradation rate to the number of times of charge and discharge, that is, an excellent cycle property.

A lithium ion battery is usually constituted of a positive electrode, a negative electrode, an electrolyte, and a separator. As a positive electrode active material to be used for the positive electrode, lithium cobaltate ($LiCoO_2$), manganese spinel ($LiMn_2O_4$), and the like are mainly used. Since the positive electrode active material has a high electric resistance, the electric resistance of the positive electrode is decreased by using carbon-based conductive additives. As a binder, for example, styrene-butadiene rubber, fluororubber, synthetic rubber, a polymer such as polyvinylidene fluoride, an acryl resin, and the like are used.

A negative electrode active material to be used is natural graphite, artificial graphite obtained by thermally treating coal, petroleum pitch or the like at a high temperature, amorphous carbon obtained by thermally treating coal, petroleum pitch coke, acetylene pitch coke or the like, a lithium alloy such as metallic lithium or AlLi, or the like. Carbon-based conductive additives are used for a negative electrode in some cases for the purpose of decreasing the resistance.

As an electrolyte solution, a nonaqueous electrolyte solution in which an electrolyte such as a lithium salt is dissolved, is used. As the lithium salt, $LiPF_6$, $LiBF_4$, a lithium imide salt, $LiClO_4$, or the like are used. A separator is constituted of a film to separate a positive electrode and a negative electrode and prevent short-circuit of both the electrodes.

In lithium ion batteries having the above-mentioned constitutions, a technology using a spherical or massive carbon-based material as a negative electrode active material is described in Patent Literatures 1 and 2 (JP11-154513A and JP11-263612A). When a negative electrode active material is made in such a shape, a crystal orientation of the negative electrode active material is directed in various directions even after a rolling step for negative electrode fabrication. Thereby, lithium ions transfer smoothly between electrodes, and a lithium ion battery excellent in output properties can be made. In addition, there are many gaps are between the negative electrode active materials, and flow paths of an electrolyte solution are formed also in the direction perpendicular to the thickness direction of the negative electrode, thereby contributing smooth transfer of lithium ions. Therefore, in many lithium ion batteries for EVs and HEVs, as the negative electrode active material, a spherical or massive carbon-based material comes to be used.

However, on the other hand, if a negative electrode active material is made of a spherical or massive shape, the contact between the negative electrode active materials is liable to become point contact. Therefore, the electric resistance (electronic resistance) of a conductive network to carry electrons to a collector sometimes becomes high and sometimes become instable. Then, in order to reduce the electric resistance of a negative electrode, Patent Literature 3 (JP2005-142004A) discloses a technology of adding conductive additives of carbon black. Since carbon black is composed of primary particles of the order of several tens of nanometers, carbon black is easy to aggregate, and carbon black forms secondary particles and bridges between active materials; therefore, the carbon black is effective for securing the conductivity in the early charge and discharge cycle.

In addition, patent Literature 4 (JP2000-3724A) discloses a secondary battery in which: the negative electrode is composed of a graphite; and the electrolyte solution contains a cyclic carbonate and a chain carbonate as main components, and the electrolyte solution contains 0.1 wt % or more and 4 wt % or less of 1,3-propane sultone and/or 1,4-butane sultone. Here, it is conceivable that 1,3-propane sultone and 1,4-butane sultone contribute to the SEI (Solid Electrolyte Interface) or surface film formation on the carbon material surface. That is, it is conceivable that these sultones coat a material having a high degree of graphitization of a high crystallinity, such as natural graphite and artificial graphite, with a passive film, and have a suppressing effect on the decomposition of an electrolyte solution without impairing the normal reaction of a battery.

Additionally, patent Literature 5 (JP2003-289432A) discloses a cyclic sulfonate ester including at least two sulfonyl groups as another additive for the electrolyte solution.

CITATION LIST

Patent Literature

[Patent Literature 1]
JP11-154513A
[Patent Literature 2]
JP11-263612A
[Patent Literature 3]
JP2005-142004
[Patent Literature 4]
JP2000-3724
[Patent Literature 5]
JP2003-289432

SUMMARY OF INVENTION

Technical Problem

However, the lithium ion battery using a spherical or massive carbon-based material as a negative electrode active material and raised in the conductivity by addition of carbon black as conductive additives as described above has problems as described below.

That is, in repetition of the charge and discharge cycle, the carbon black reacts with an electrolyte solution and the primary particles are gasified in some cases; and the carbon black vanishes due to etching and the conductive network of the secondary particles is disconnected in some cases. As a result, the rapid resistance rise and the capacity reduction of the lithium ion battery are caused in some cases.

In addition, an additive added to an electrolyte solution decomposes and has a function of forming good-quality SEI films on surfaces of a main-material active material and conductive additives in the early charging time. The SEI films can prevent the degradation of the main-material active material and a solvent component, and provide a lithium ion battery having excellent output properties and capacity properties.

However, when there is used negative electrode active materials composed of a graphite, an amorphous carbon and the like or carbon materials having a not high degree of graphitization, such as graphite-based conductive additives, so good SEI films are not formed in the early charging time, and part of the SEI film is broken during the charge and discharge cycle. Moreover, in a state where the charge and discharge cycle has sufficiently been repeated, the additive is not so much left and no SEI film can be formed. Therefore, the solvent component and the like which intrinsically must not be decomposed are decomposed to resultantly form a film on the electrode, resulting in degrading the film quality greatly. As a result, the charge transfer resistance of the film formed during the charge and discharge cycle increases to resultantly greatly degrade the output properties and the capacity properties.

In addition, since carbon black enters gaps of an electrode active material so as to fill the gaps, the carbon black decreases spaces of the gaps to store an electrolyte solution. As a result, if the charge and discharge cycle is repeated, the electrolyte solution is liable to be depleted and the rapid capacity degradation phenomenon (rapid fading phenomenon) is liable to be caused.

From the above, conventional lithium ion batteries have problems in points including long-term life properties, suppression of rapid capacity degradation, operation in a low-temperature environment and the like, which are necessary for lithium ion batteries particularly for EVs and HEVs.

Then, an object of the present invention is to provide a lithium ion battery which is excellent in long-term life properties, does not cause the rapid capacity degradation, and is excellent in charge and discharge properties in a low-temperature environment.

Solution to Problem

One exemplary embodiment relates to:
a lithium ion battery comprising:
a negative electrode including a negative electrode active material containing at least one of a graphite and an amorphous carbon, conductive additives containing a graphite, and a binder;
a nonaqueous electrolyte solution; and
a positive electrode containing a positive electrode active material capable of occluding and releasing lithium,
wherein the negative electrode active material has a spherical or massive shape (i.e., a particulate shape);
the conductive additives have a platy shape,
a part of an edge surface of the conductive additives contacts with a surface of the negative electrode active material, and
the nonaqueous electrolyte solution contains a solvent, and an additive which reductively decomposes at a voltage lower than a reduction voltage of the solvent.

Advantageous Effects of Invention

The present invention can provide a lithium ion battery which is excellent in long-term life properties, does not cause the rapid capacity degradation, and is excellent in charge and discharge properties in a low-temperature environment.

BRIEF DESCRIPTION OF DRAWINGS

FIG. 1 is a schematic cross-sectional diagram to describe a structure of a lithium ion battery according to the present exemplary embodiment.

FIG. 2 is a diagram showing capacity changing curves at cell voltages of 1.5 to 3.5 V of batteries of Examples 1 and 2 and Comparative Example 1.

FIG. 3 is a diagram showing capacity changing curves at cell voltages of 2.4 to 4.0 V of batteries of Examples 1 and 2 and Comparative Example 1.

DESCRIPTION OF EMBODIMENTS

FIG. 1 shows a schematic cross-sectional diagram to describe a structure of a lithium ion battery according to one exemplary embodiment. In the lithium ion battery, a negative electrode 1 including a layer containing a negative electrode active material 3 on a negative electrode collector 4, and a positive electrode 7 including a layer containing a positive electrode active material 5 on a positive electrode collector 6 are laminated with a separator 8 interposed therebetween. The separator 8 is impregnated in an electrolyte solution 9. The negative electrode 1 of the lithium ion battery according to the present exemplary embodiment contains platy graphite conductive additives 2.

The negative electrode active material 3 is not especially limited as long as being graphite or amorphous carbon capable of occluding and releasing cations; and usable are natural graphite, crystalline artificial graphitized materials obtained by thermally treating coal, petroleum pitch or the like at a high temperature, amorphous carbon obtained by thermally treating coal, petroleum pitch coke, acetylene pitch coke or the like. If natural graphite is particularly used as the negative electrode active material 3, a large improving effect can be anticipated.

Since orientation of natural graphite in a specific direction is larger by pressing in electrode fabrication in comparison to that of artificial graphite, natural graphite has a concern about lithium ion-occluding and releasing properties; so, artificial graphite, which is highly costly, has conventionally been applied in the fields requiring the high performance and long life.

In contrast, in the present exemplary embodiment, use of platy graphite conductive additives, which are homogeneously dispersed, can be anticipated to have a suppressing effect on the orientation in a specific direction of natural graphite. Therefore, the present exemplary embodiment allows application of natural graphite, which is relatively inexpensive, to fields (for example, vehicles or power storage systems) requiring the high performance and long life.

As the negative electrode active material 3, graphite whose surface is covered with amorphous carbon can also be used. In this case, an amorphous carbon layer has an action of retarding impregnatability of the electrolyte solution. Therefore, by securing flow paths of the electrolyte solution in gaps among the negative electrode active materials by using the platy graphite conductive additives, the properties of the lithium ion battery can be greatly improved.

In addition, the negative electrode active material 3 has a spherical or massive shape. The reason is because that since the orientation of the crystal is directed in various directions also after a rolling step in electrode fabrication by using such a shape, the transfer of lithium ions between electrodes can be carried out smoothly. That is also because that since gaps through which the electrolyte solution flows among the negative electrode active materials are easily made, high output properties are excellent. A copper foil or the like can be used as the negative electrode collector 4.

In the above description, the case of using graphite as the negative electrode active material was described, but the negative electrode active material according to the present invention is not limited thereto. As the negative electrode active material, amorphous carbon such as hard carbon (hardly graphitized carbon) and soft carbon (easily graphitized carbon) may be used. In addition, graphite and amorphous carbon can be used concurrently.

That the negative electrode active material has a spherical or massive shape (i.e., a particulate shape), and that the conductive additives have a platy shape can be confirmed by SEM (scanning electron microscope) observation. That is, in a SEM image of the negative electrode active material, in the case where (minor axis)/(major axis), which is a ratio of a length in the minor axis direction (a length in the direction giving the shortest length) to a length in the major axis direction (a length in the direction giving the longest length), is larger than 0.2, the negative electrode active material can be judged to have a spherical or massive shape. The (minor axis)/(major axis) of the negative electrode active material is preferably 0.3 or higher, and more preferably 0.5 or higher. In addition, in a SEM image of the conductive additives acquired similarly, in the case where the ratio (minor axis:a length in the c axis direction)/(major axis: a length in the a axis direction) is 0.2 or lower, the conductive additives are judged to have a platy shape. The (minor axis: a length in the c axis direction)/(major axis: a length in the a axis direction) of the conductive additives is preferably 0.1 or lower, and more preferably 0.05 or lower.

In observation of 50 particles of the conductive additives in a SEM image of the negative electrode, the case where part of ends in the major axis direction of the particles contacts with surfaces of the negative electrode active material, is judged as that "part of an edge surface of a conductive additives contacts with a surface of a negative electrode active material". In the present exemplary embodiment, in a preferable state, in the case where 30 particles of the conductive additives are observed, part of ends in the major axis direction of the particles contacts with surfaces of the negative electrode active material; and in a more preferable state, in the case where 10 particles of the conductive additives are observed, part of ends in the major axis direction of the particles contacts with surfaces of the negative electrode active material.

Whereas the negative electrode active material of graphite contributes to charge and discharge of the lithium ion battery, and has a specific surface area smaller than 10 $m^2/g$, the conductive additives of graphite have different points in which the material improves the conductivity in the negative electrode, and has a specific surface area of 10 $m^2/g$ or larger.

The positive electrode active material 5 is not especially limited as long as absorbing cations in the discharging time, and usable are metal oxides of lithium-transition metal composite oxides, for example, lithium-cobalt composite oxides ($LiCoO_2$, $LiCoAlO_2$, $LiCoMnO_2$ and the like), lithium-nickel composite oxides ($LiNiO_2$, $LiNiCoO_2$, $LiNiMnO_2$, $LiNiCoMnO_2$ and the like), lithium-manganese composite oxides ($LiMnO_2$, $LiMn_2O_4$, $LiMnMgO_4$, $Li_2MnO_3$ and the like), and olivine type phosphates ($LiFePO_4$ and the like). As the positive electrode collector 6, an aluminum foil or the like can be used.

The binder 11 is used in a layer containing the negative electrode active material in the negative electrode 1, and as the case may be, can be also used in a layer containing the positive electrode active material in the positive electrode 7. For example, in the negative electrode 1, the binder 11 adheres fellow particles of the negative electrode active material 3, the negative electrode active material 3 with the conductive additives 2, and further the negative electrode active material 3 with the negative electrode collector 4. The binder is not especially limited, but suitable are polyvinylidene fluoride (PVDF), styrene-butadiene rubber (SBR), acrylic polymers and the like. For an organic binder, N-methyl-2-pyrrolidone (NMP) is best as a solvent. In addition, for an SBR-based aqueous binder, a thickener such as carboxymethyl cellulose (CMC) can be used. With respect to the amount of a binder, in case of a small amount thereof, a sufficient adhesion strength (peel strength) cannot be obtained; and in case of a too large amount thereof, since the binder inhibits free transfer-in and out of lithium ions, a charge transfer resistance increases and the battery capacity also decreases. The proportion of a binder with respect to a negative electrode mixture is preferably 1 mass % to 20 mass %, and more preferably 2 mass % to 10 mass %.

The platy graphite conductive additives 2 contact surfaces of the spherical or massive negative electrode active material 3 by part of edge surfaces of the graphite conductive additives. Thereby, the electronic resistance of the negative electrode becomes low and the life properties of the battery can simultaneously be greatly improved. In the platy graphite conductive additives 2, the electric resistance in the a axis direction (a direction along a hexagonal network plane of carbon forming graphite; in a platy graphite, in the in-plane direction of the plate) of a graphite structure is lower by about three digits than that in the c axis direction (the thickness direction of stacking hexagonal network planes of carbon forming graphite; in the platy graphite, the direction perpendicular to the plate), providing the a axis direction with better conductivity. Therefore, if both end surfaces (edge surfaces) of the platy graphite conductive additives are made to contact surfaces of the negative electrode active material as shown in FIG. 1, the resistance of the negative electrode can be reduced mostly.

In addition, SEI films are formed on the negative electrode active material and the conductive additives as well in the early charging time, but if the conductive additives contact the negative electrode active material by the edge surfaces of conductive additives, SEI films of contact portions become hardly broken in the charge and discharge cycle. The reason is conceivably because that since the thickness of the edges is thin, areas of contact portions are smaller than when the basal plane (a plane having the normal vector in the c axis direction) contacts therewith, and a force exerted on contact portions becomes small even if each particle expands and contracts along with charge and discharge to thereby suppress the mechanical breakage. In addition, the reason is conceivably because that since the conductive additives comprise graphite, an additive in the electrolyte solution is decomposed with the conductive additives as a starting point, and good-quality SEI films are formed also on surfaces of the negative electrode active material through contact portions to thereby form strong bonds. Breakage of SEI films is thus suppressed; thereby, good SEI films in the charging early stage are maintained and the life properties of the lithium ion battery can be greatly improved.

Conventional conductive additives whose primary particles are very small (in the order of several tens of nanometers), such as carbon black and Ketjen black, have high aggregatability, and make the slurry viscosity high and the gelation of the slurry easy in electrode fabrication in some cases, and make difficult the homogeneous dispersion thereof among negative electrode active materials in some cases. Therefore, although portions where the conductive additive aggregates have conductivity, places other than the portions have worsened conductivity, thus making unevenness in the conductive network. Additionally, although conductive networks formed by containing aggregation of such very small primary particles are effective for securing the conductivity in the cycle early stage, in repetition of the charge and discharge cycle, the conductive additives react with the electrolyte solution to thereby cause gasification of the primary particles by oxidation, and the conductive networks of secondary particles are disconnected by etching, thereby causing a rapid resistance rise and capacity reduction in some cases. Further, fine particles such as carbon black fill gaps among the negative electrode active materials in some cases.

In contrast, since the platy graphite conductive additives according to the present invention have a relatively large particle diameter, the conductive additives are excellent in homogeneous dispersibility, and conductive networks are scarcely disconnected even during the charge and discharge cycle, thereby suppressing a rapid resistance rise and capacity reduction. Additionally, the platy graphite conductive additives can make reasonable gaps among the spherical or massive negative electrode active materials. Therefore, electrolyte solution flow paths are easily formed not only to make easy the transfer of lithium ions but also to function as liquid reservoirs of the electrolyte solution. Therefore, depletion of the electrolyte solution during the charge and discharge cycle can be suppressed and the rapid capacity degradation can be suppressed.

An average particle diameter $D_{50s}$ of the negative electrode active material and an average particle diameter $D_{50a}$ of the platy graphite conductive additives meet $3 \leq D_{50s}/D_{50a} \leq 10$, thereby greatly improving properties of the lithium ion battery. In the case where $D_{50s}/D_{50a}$ is lower than 3, that is, in the case where the average particle diameter of the platy graphite conductive additives is relatively large, the platy graphite conductive additives are not likely to contact the negative electrode active material by the edge surfaces of the platy graphite conductive additives with one another. That is, a state is liable to be made in which the negative electrode active material is divided by upper and lower basal planes of the platy graphite conductive additives. On the other hand, in the case where $D_{50s}/D_{50a}$ is higher than 10, that is, in the case where the average particle diameter of the platy graphite conductive additives is small, the platy graphite conductive additives are likely to contact particles of the negative electrode active material on basal planes of the conductive additives. The reason is because that since the platy graphite conductive additives are small, a state is liable to be made in which the platy graphite conductive additives just stick, on the basal planes, to surfaces of the negative electrode active material particles. In this state, since the platy graphite conductive additives are hard to connect the negative electrode active material particles with each other on the edge surfaces, not only the conductivity-improving effect is small, but also occlusion and release of lithium ions in and from the negative electrode active material particles is inhibited. Therefore, in order to contact part of edge surfaces of the platy graphite conductive additives with the negative electrode active material, platy graphite conductive additives having nearly the same size as the gaps between the negative electrode active materials are preferably selected; therefore, $D_{50s}/D_{50a}$ is preferably made to be 3 or higher and 10 or lower. The case of satisfying such an average particle diameter ratio can greatly improve battery properties as described before. The average particle diameter $D_{50s}$ of a negative electrode active material and the average particle diameter $D_{50a}$ of platy graphite conductive additives are determined from particle size distribution measurements in terms of volume by using a laser diffraction and scattering-type particle diameter and particle size distribution instrument to detect the particle diameter by laser light scattering.

The content of the platy graphite conductive additives in the negative electrode mixture is preferably made to be 2.0 mass % or higher and 10 mass % or lower. If the content of the platy graphite conductive additives is lower than 2.0 mass %, the number of the conductive additives intercalated among the negative electrode active materials is insufficient, and sufficient conductive networks cannot be formed, whereby the conductivity-improving effect cannot sufficiently be exhibited in some cases. On the other hand, if the content is higher than 10 mass %, since the conductive additives enter among the negative electrode active materials more than needed and gaps are resultantly formed, the cell thickness in the early stage of a lithium ion battery increases in some cases. Particularly in vehicular lithium ion batteries, since a plurality of lithium ion batteries are stacked and arranged in a limited accommodation space, it is considered to be necessary on design that an increase in the cell thickness due to the addition of conductive additives is made to be 10% or smaller. Therefore, making the content to be 10 mass % or lower can make the increasing ratio of the cell thickness to be 10% or lower.

The thickness of the platy graphite conductive additives is preferably 0.05 μm or larger and 0.5 μm or smaller. If the thickness of the platy graphite conductive additives is larger than 0.5 μm, since the edge surfaces of graphite of the platy graphite conductive additives increase, side-reactions with an electrolyte solution become extensive and gaps enhancing permeability of the electrolyte solution are clogged in some cases. On the other hand, if the thickness of the platy graphite conductive additives is smaller than 0.05 μm, the mechanical strength to pressing in electrode fabrication cannot be held in some cases. Here, the thickness of the platy graphite conductive additives can be calculated as an average thickness acquired by the SEM (scanning electron microscope) observation of 100 particles of the platy graphite conductive additives.

The specific surface area of the platy graphite conductive additives is preferably 10 $m^2/g$ or larger and 40 $m^2/g$ or smaller. If the specific surface area exceeds 40 $m^2/g$, since side reactions with the electrolyte solution become extensive, and gas is generated, the life properties of the battery are degraded in some cases. On the other hand, if the specific surface area is smaller than 10 m²/g, the particle diameter of the platy graphite conductive additives becomes large and the efficient contact in gaps among the negative electrode active materials cannot be made in some cases. The specific surface areas of conductive additives according to related technologies are, for example, much as large as 800 m²/g to 1,300 m²/g for Ketjen black, and in the range of 50 m²/g to 100 m²/g for acetylene black and carbon black. Therefore, the specific surface areas of conductive additives according to related technologies are usually larger by 2 to 4 times than the specific surface area of the platy graphite conductive additives according to the present invention. Since the platy graphite conductive additives according to the present invention have a relatively small specific surface area and simultaneously have a platy particle shape, the conductive additives resultantly have very good properties as conductive additives. Here, the specific surface area of platy graphite conductive additives can be measured by the BET method.

The platy graphite conductive additives are preferably artificial graphite whose crystallinity has reasonably developed, but is not limited thereto. Even natural graphite-type platy graphite conductive additives are preferable as long as the natural graphite has crystallinity equal to that of artificial graphite. The crystallinity of the conductive additives surface can be evaluated by Raman spectroscopy. With respect to Raman bands of graphite, a G band (near 1,580 to 1,600 cm$^{-1}$) corresponding to the in-plane vibration mode and a D band (near 1,360 cm$^{-1}$) derived from in-plane defects are observed. With these peak intensities taken as $I_G$ and $I_D$ respectively, a higher peak intensity ratio $I_G/I_D$ means a higher degree of graphitization. In the Raman spectroscopic property of the platy graphite conductive additives, $I_G/I_D$ is preferably 6 or higher and 12 or lower. This Raman peak intensity ratio is a higher value than the Raman peak intensity ratio $I_G/I_D=1.0$ of carbon black. In the case where $I_G/I_D$ is a lower value than 6, the effect of forming the film on the electrode surface by an additive is worsened in some cases; and in the case where $I_G/I_D$ is a higher value than 12, the reactivity with the electrolyte solution rises and the life properties are worsened in some cases.

The physical properties of the platy graphite conductive additives depend on the burning temperature and the kind and pressure of atmosphere gas in the production time; and by varying production conditions, various types of platy graphite conductive additives can separately be fabricated. For example, in the case of using coal pitch as a raw material, the production method includes a method of mixing the coal pitch with petroleum pitch or coal tar pitch or the like, and burning the mixture at 2,000 to 3,000° C. Additionally, platy graphite conductive additives with a covering having physical and chemical properties equal to those of artificial graphite can be obtained by thermally decomposing hydrocarbons, for example, benzene, xylene and the like, by a CVD method, and vapor-depositing the thermally decomposed hydrocarbons on the surface of a base material of natural graphite.

As a solvent for the electrolyte solution 9, usable is at least one organic solvent selected from cyclic carbonates, chain carbonates, aliphatic carboxylate esters, γ-lactones, cyclic ethers, chain ethers, and fluorinated derivatives thereof.

More specifically, the solvent includes:
cyclic carbonates: propylene carbonate (PC), ethylene carbonate (EC), butylene carbonate (BC) and derivatives thereof;
chain carbonates: dimethyl carbonate (DMC), diethyl carbonate (DEC), ethyl methyl carbonate (EMC), dipropyl carbonate (DPC) and derivatives thereof;
aliphatic carboxylate esters: methyl formate, methyl acetate, ethyl propionate and derivatives thereof;
γ-lactones: γ-butyrolactone and derivatives thereof;
cyclic ethers: tetrahydrofuran, 2-methyltetrahydrofuran and derivatives thereof;
chain ethers: 1,2-diethoxyethane (DEE), ethoxymethoxyethane (EME), diethyl ether and derivatives thereof; and
others: dimethyl sulfoxide, 1,3-dioxolane, formamide, acetamide, dimethylformamide, acetonitrile, propionitrile, nitromethane, ethyl monoglyme, phosphorate triesters, trimethoxymethane, dioxolane derivatives, methyl sulfolane, 1,3-dimethyl-2-imidazolidinone, 3-methyl-2-oxazolidinone, anisole, N-methylpyrrolidone and fluorinated carboxylate esters. These can be used singly or as a mixture of two or more of them.

In addition, in the solvent, salts can be dissolved which are composed of cations of alkaline metals such as Li, K and Na and anions of compounds containing halogens, such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$ and $(C_2F_5SO_2)_3C^-$. In addition, a solvent composed of these basic solvents and an electrolyte salt may be also used singly or in combination of two or more. A gelatinous electrolyte in which an electrolyte solution is contained in a polymer gel may be used.

The electrolyte solution further contains an additive which reductively decomposes at a voltage lower than a reduction voltage of a solvent. The additive reductively decomposes in the charge and discharge time earlier than the solvent, and forms a good-quality SEI film on the negative electrode surface. Moreover, even in the case where the charge and discharge are repeated, the SEI film can be stably maintained on the negative electrode surface. The SEI film has functions of suppressing the decomposition reaction of the electrolyte solution on the negative electrode surface, carrying out the desolvation reaction along with intercalation and deintercalation of lithium ions, and suppressing the physical structural degradation of the negative electrode active material.

As the additive, a cyclic sulfonate ester having two sulfonyl groups and represented by the following general formula (1) is preferable used.

[Formula 1]

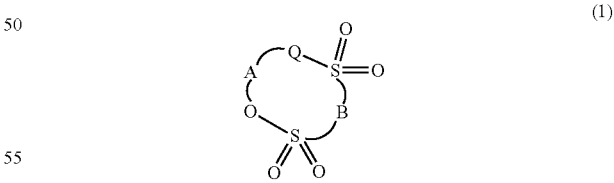

(1)

wherein in the above general formula (1), Q represents an oxygen atom, a methylene group or a single bond; A represents a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms to which an alkylene unit or a fluoroalkylene unit is bonded through an ether bond; and B represents a substituted or unsubstituted alkylene group, a substituted or unsubstituted fluoroalkylene group or an oxygen atom.

In compounds represented by the above general formula (1), from the viewpoint of stability of the compounds, easiness of synthesis of the compounds, dissolvability thereof to a solvent, prices thereof, and the like, A is preferably an alkylene group having 1 to 5 carbon atoms, a fluoroalkylene group having 1 to 5 carbon atoms, or a divalent group having 2 to 6 carbon atoms to which an alkylene unit or a fluoroalkylene unit is bonded through an ether bond. Moreover, for the same reason, B is preferably an alkylene group having 1 to 5 carbon atoms.

As the additive, a chain sulfonate ester having two sulfonyl groups and represented by the following general formula (2) is usable.

[Formula 2]

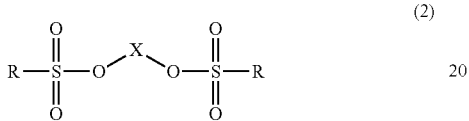

(2)

wherein in the above general formula (2), X represents an alkylene group having 1 to 6 carbon atoms; and R represents an alkyl group having 1 to 6 carbon atoms, and two Rs may be the same group or different groups.

In the case of using, as a solvent, ethylene carbonate, propylene carbonate, dimethyl carbonate, diethyl carbonate or methyl ethyl carbonate, an additive reductively decomposing at a voltage lower than the reduction voltage of FEC of a solvent includes vinylene carbonate (VC), propane sultone (PS), fluoroethylene carbonate (FEC) and compounds represented by the following formulae (3) to (25), but is not limited thereto.

[Formula 3]

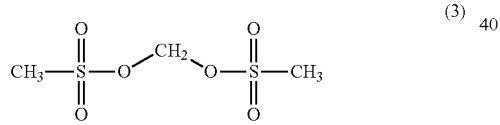

(3)

[Formula 4]

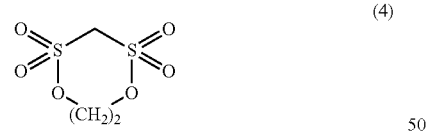

(4)

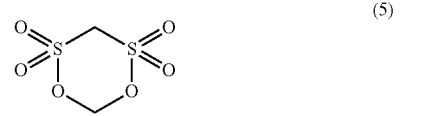

(5)

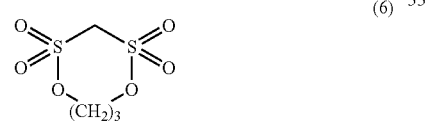

(6)

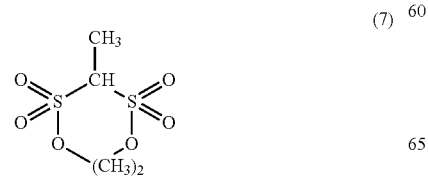

(7)

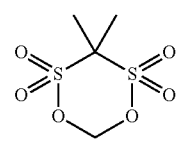

(8)

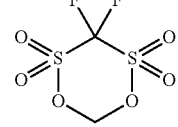

(9)

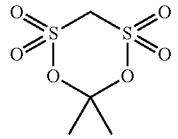

(10)

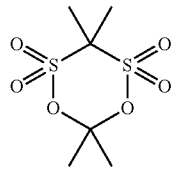

(11)

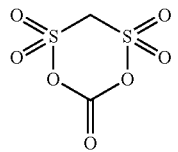

(12)

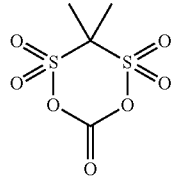

(13)

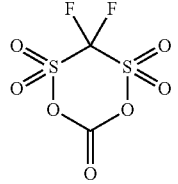

(14)

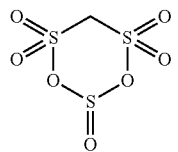

(15)

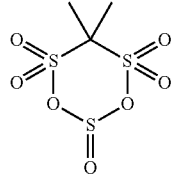

(16)

(17)
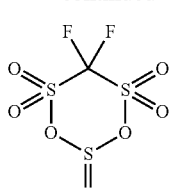

(18)
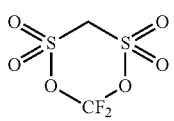

(19)
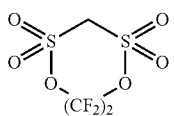

(20)
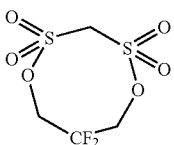

(21)
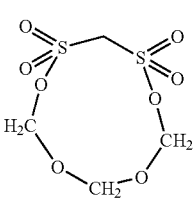

(22)
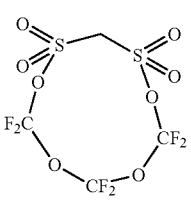

(23)
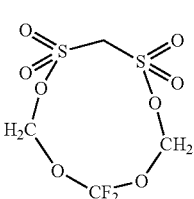

(24)
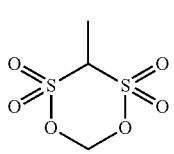

(25)
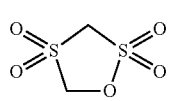

The content of an additive reductively decomposing at a voltage lower than a reduction voltage of a solvent in an electrolyte solution is not especially limited, but is preferably 0.5 mass % or more and 10.0 mass % or less in the electrolyte solution. With the content less than 0.5 mass %, the additive cannot exhibit a sufficient effect on formation of a film by an electrochemical reaction on the electrode surface in some cases. With the content exceeding 10.0 mass %, the viscosity of the electrolyte solution is made high in some cases.

EXAMPLES

1. Examples in which a Graphite was Used as the Negative Electrode Active Material

Example 1

92 parts by mass of a manganese spinel ($LiMn_2O_4$) powder having an average particle diameter of 10 μm as a positive electrode active material, 4 parts by mass of a binder, and 4 parts by mass of a carbon black as conductive additives were homogeneously dispersed in NMP to thereby fabricate a slurry for a positive electrode. As the binder, since use of any binder of a PVDF (polyvinylidene fluoride), an aqueous SBR binder and an acrylic binder could provide the effects of the present invention, the PVDF was used in the present Example.

The reason of using the carbon black as conductive additives for the positive electrode was because the positive electrode did not exhibit volume expansion and contraction due to repetition of charge and discharge, which would be seen in a negative electrode, and the carbon black had a different potential. The reason was also because disappearance (gasification) of primary particles did not almost occur, and disconnection of the conductive network, which would be seen in the negative electrode, did not almost occur.

The positive electrode was fabricated by uniformly applying the slurry for the positive electrode on an aluminum foil of 20 μm in thickness as a positive electrode collector by using a coater, and thereafter evaporating NMP. After the one surface of positive electrode collector was dried, a positive electrode was similarly fabricated on the rear surface of positive electrode collector to thereby make a double-sided coated electrode. After drying, the positive electrode density was regulated by a roll press. The amount of the positive electrode mixture per unit area was made to be 48 mg/cm².

In NMP, 2 parts by mass of a platy artificial graphite 2A (average particle diameter (in terms of volume) $D_{50a}$=2.5 average plate thickness=0.05 specific surface area=20 m²/g, and G/D ratio ($I_G/I_D$) by Raman spectroscopy=12) as conductive additives, 6 parts by mass of a binder, and 92 parts by mass of a massive natural graphite (a massive natural graphite covered with an amorphous carbon material on the surface thereof; average particle diameter $D_{50s}$=20 μm) were added to thereby fabricate a slurry for a negative electrode. As the binder, since use of any binder of a PVDF (polyvinylidene fluoride), an aqueous SBR binder and an acrylic binder could provide the effects of the present invention, the PVDF was used in the present Example. The negative electrode was fabricated by uniformly applying the slurry for the negative electrode on a copper foil of 10 μm in thickness as a negative electrode collector by using a coater, and thereafter evaporating NMP. After drying, the negative electrode density was regulated by a roll press. The amount of the negative electrode mixture after the drying was made to be 8 mg/cm². The composition of the negative electrode mixture became 2 mass % of the platy graphite, 6 mass % of the PVDF, and 92 mass % of the massive natural graphite. In addition, $D_{50s}/D_{50a}$, which was a ratio of an average particle diameter $D_{50s}$ of the massive natural graphite to an average particle diameter $D_{50a}$ of the platy graphite conductive additives, was 8. $D_{50s}$ and $D_{50a}$ were measured by a laser diffraction particle size distribution analyzer.

An electrolyte solution was used which was obtained by dissolving $LiPF_6$ of 1 mol/L as an electrolyte in ethylene carbonate (EC):diethyl carbonate (DEC)=40:60 (vol %) as a solvent, and mixing 2.0 mass % of a cyclic disulfonate ester (propylenemethanedisulfonate) represented by the following formula (4) as an additive. The cyclic disulfonate ester reductively decomposes at a voltage lower than reduction voltages of EC and DEC which are the solvent.

[Formula 5]

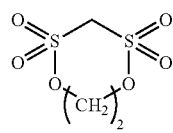

(4)

Next, a battery of a medium-sized laminate cell was fabricated. Hereinafter, a fabrication method of the medium-sized laminate cell will be described. The above-mentioned positive electrode was cut into 8.0 cm×4.8 cm, and the above-mentioned negative electrode was cut into 9.0 cm×5.6 cm. Here, one side 8.0 cm×1.0 cm of the positive electrode and one side 9.0 cm×1.0 cm of the negative electrode were left as uncoated portions to be connected with tabs. An aluminum-made positive electrode tab of 7 mm width, 12 cm length and 0.1 mm thickness was welded to the uncoated portion of the positive electrode. As for the negative electrode, a nickel-made negative electrode tab having the same shape was similarly welded to the uncoated portion of the negative electrode. As a separator, polypropylene of 10 cm×7.0 cm was applied. The separators covered both the surfaces of the positive electrodes, and the negative electrode was disposed so as to face each of the positive electrodes from both surfaces to thereby fabricate an electrode laminate.

Then, the electrode laminate was interposed by two sheets of aluminum laminate films of 16 cm×10 cm; and three sides excluding one side of long sides were thermally sealed by a width of 8 mm; the electrolyte solution was injected; and thereafter, the residual one side was thermally sealed to thereby fabricate the medium-sized laminate cell battery.

Example 2

A battery was fabricated as in Example 1, except for using a composition of a negative electrode mixture of 5 mass % of the platy graphite (the same as in Example 1) as conductive additives, 6 mass % of PVDF, and 89 mass % of the massive natural graphite (the same as in Example 1).

Example 3

A battery was fabricated as in Example 2, except for using a chain sulfonate ester represented by the following formula (3) in place of the compound of the formula (4) as an additive in the electrolyte solution.

[Formula 6]

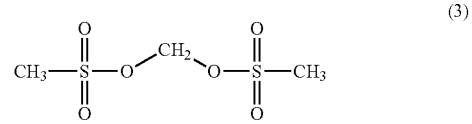

(3)

Example 4

A battery was fabricated as in Example 2, except for adding 2.0 mass % of vinylene carbonate (VC) as an additive in the electrolyte solution. VC reductively decomposes at a voltage lower than the reduction voltages of EC and DEC as solvents.

Example 5

A battery was fabricated as in Example 2, except for adding 2.0 mass % of propane sultone (PS) as an additive in the electrolyte solution. PS reductively decomposes at a voltage lower than the reduction voltages of EC and DEC as solvents.

Example 6

A battery was fabricated as in Example 2, except for adding 1.0 mass % of the compound represented by the above formula (4) and 1.0 mass % of vinylene carbonate (VC) as additives in the electrolyte solution.

Example 7

A battery was fabricated as in Example 2, except for adding 1.0 mass % of the compound represented by the above formula (4) and 1.0 mass % of propane sultone (PS) as additives in the electrolyte solution.

Comparative Example 1

A battery was fabricated as in Example 1, except for using a composition of a negative electrode mixture of 2 mass % of the carbon black, 6 mass % of the PVDF, and 92 mass % of the massive natural graphite (the same as in Example 1).

Comparative Example 2

A battery was fabricated as in Example 4, except for using a composition of a negative electrode mixture of 2 mass % of the carbon black, 6 mass % of the PVDF, and 92 mass % of the massive natural graphite (the same as in Example 4).

Comparative Example 3

A battery was fabricated as in Example 5, except for using a composition of a negative electrode mixture of 2 mass % of the carbon black, 6 mass % of the PVDF, and 92 mass % of the massive natural graphite (the same as in Example 5).

(Shapes of the Negative Electrode Active Material and the Conductive Additives, and Confirmation of the Contact State of the Negative Electrode Active Material and the Conductive Additives)

There were confirmed by the SEM (scanning electron microscope) observation that the negative electrode active materials of Examples 1 to 7 had a spherical or massive shape, that the conductive additives had a platy shape, and that part of edge surfaces of the conductive additives contacted with surfaces of the negative electrode active materials.

(Measurement of a Capacity Maintenance Rate in a High-Temperature Environment)

The life test was carried out by repeating the charge and discharge in a constant temperature bath. Specifically, the lithium ion batteries fabricated in Examples 1 to 7 and Comparative Examples 1 to 3 were charged under the 1 C constant current charging condition up to an upper limit voltage of 4.2 V, and successively charged in the constant voltage charging at 4.2 V, being thus charged for a total charging time of 2.5 hours. The discharging was carried out in the 1 C constant current discharging down to 2.5 V. This charge and discharge were taken as 1 cycle, and repeated for 500 cycles. Then, a ratio of a discharge capacity after 500 cycles to an initial discharge capacity was defined as a capacity maintenance rate. The temperature of the constant temperature bath was set at a high temperature of 55° C. because the degradation was accelerated and the life property could be grasped in the early stage.

Properties of conductive additives in the negative electrodes of the respective lithium ion batteries are shown in Table 1; and constitutions of the negative electrodes of the respective lithium ion batteries, and measurement results of capacity maintenance rates after 500 cycles are shown in Table 2.

TABLE 1

| Kind of Conductive Additives | Size of Primary Particle | Distribution of Secondary Particle | Form of Particle | Specific Surface Area BET/$N_2$ ($m^2/g$) | Raman G/D Ratio ($I_G/I_D$) |
|---|---|---|---|---|---|
| Platy Graphite | $D_{50a}$ = 2.5 μm plate thickness = 0.05 μm | not aggregated | platy | 20 | 12 |
| Carbon Black | average particle diameter = 40 nm | 5-100 μm | particulate | 60 | 1.0 |

TABLE 2

| Sample | Kind of Negative Electrode Active Material | Kind of Platy Graphite Conductive Additives | Content of Platy Graphite Conductive Additives in Negative Electrode Mixture (mass %) | Content of Carbon Black in Negative Electrode Mixture (mass %) | Kind of Additive in Electrolyte Solution | Content of Additive in Electrolyte Solution (mass %) | Capacity Maintenance Rate After 500 Cycles at 55° C. (%) |
|---|---|---|---|---|---|---|---|
| Example 1 | massive natural graphite | platy graphite | 2 | 0 | compound of formula (4) | 2 | 70 |
| Example 2 | massive natural graphite | platy graphite | 5 | 0 | compound of formula (4) | 2 | 75 |
| Example 3 | massive natural graphite | platy graphite | 5 | 0 | compound of formula (3) | 2 | 74 |
| Example 4 | massive natural graphite | platy graphite | 5 | 0 | VC | 2 | 71 |
| Example 5 | massive natural graphite | platy graphite | 5 | 0 | PS | 2 | 70 |
| Example 6 | massive natural graphite | platy graphite | 5 | 0 | compound of formula (4) + VC | compound of formula (4): 1 VC: 1 | 76 |
| Example 7 | massive natural graphite | platy graphite | 5 | 0 | compound of formula (4) + PS | compound of formula (4): 1 PS: 1 | 76 |
| Comparative Example 1 | massive natural graphite | none | 0 | 2 | compound of formula (4) | 2 | 43 |
| Comparative Example 2 | massive natural graphite | none | 0 | 2 | VC | 2 | 39 |
| Comparative Example 3 | massive natural graphite | none | 0 | 2 | PC | 2 | 38 |

As shown in Table 2, the lithium ion batteries using a platy graphite as conductive additives, and using an additive reductively decomposing at a voltage lower than a reduction voltage of a solvent in the electrolyte solution could be charged and discharged without any large capacity degradation even in a high-temperature environment of 55° C.

In contrast, as shown in Comparative Examples 1 to 3, the lithium ion batteries in which a platy graphite was not used as conductive additives and 2 mass % of a carbon black was added thereto, exhibited large degradation by the cycle repetition. When an alternating impedance measurement was carried out on the lithium ion batteries whose capacity maintenance rate had thus decreased, it was found that the electronic resistance and the charge transfer resistance increased. That is, it is conceivable that since the internal resistance of the lithium ion batteries of Comparative Examples 1 to 3 increased, the capacity maintenance rate decreased. The cause of raising the electronic resistance is conceivably that the electrolyte solution was consumed in the cycle repetition and the carbon black as conductive additives did not sufficiently function, due to that a good-quality SEI film had not been formed on the negative electrode surface. The reason for the raising of the electronic resistance is also conceivable because the utilization of a carbon black alone as conductive additives resulted in cutting conductive networks by contacts among the negative electrode active materials, and the each negative electrode active substance was isolated to thereby cause the resistance rise, consequently causing the capacity degradation.

In addition, examples 6 and 7 exhibited capacity maintenance rates nearly equal to those of Examples 1 to 5. From these test results, it is found that even the concurrent use of VC or PS with the compound of the formula (4) as additives reductively decomposing at a voltage lower than a reduction voltage of a solvent could improve the cycle property at a high temperature.

It is conceivable from the above results that in the case of using a platy graphite as conductive additives, the reductive decomposition efficiency of an additive is high to thereby form a good SEI film. Observation by SEM of the surfaces of the negative electrodes fabricated in Examples 1 to 7 revealed that part of edge surfaces of the platy graphite contacted the massive natural graphite material being the negative electrode active material. It is conceivable that part of edge surfaces of the platy graphite contacted the negative electrode active material in such a manner, thereby promoting the formation of a firm SEI film. In contrast, it is conceivable that in case of use of a carbon black as conductive additives, a firm SEI film was hard to be formed between the negative electrode active material and the carbon black. Therefore, in the negative electrode, oxidation and etching by the cycle repetition occurred, and conductive networks of a so-called structure disconnected to thereby decrease the capacity maintenance rate.

(Measurement of the Capacity Maintenance Rate in a Low-Temperature Environment)

The life test was carried out by repeating the charge and discharge in a constant temperature bath. Specifically, the lithium ion batteries fabricated in Examples 1 to 7 and Comparative Examples 1 to 3 were charged under the 1 C constant current charging condition up to an upper limit voltage of 4.2 V, and successively charged in the constant voltage at 4.2 V, being thus charged for a total charging time of 2.5 hours. The discharging was carried out in the 1 C constant current discharging down to 2.5 V. This charge and discharge were taken as 1 cycle, and repeated for 500 cycles. Then, a ratio of a discharge capacity after 500 cycles to an initial discharge capacity was defined as a capacity maintenance rate. The temperature of the constant temperature bath was set at a low temperature of 0° C. in order to make the difference of the film quality of the SEI film greatly affect the resistance component of the lithium ion batteries and grasp the superiority and inferiority of battery properties in the early stage.

Measurement results of the capacity maintenance rates after 500 cycles of the respective lithium ion batteries are shown in Table 3.

TABLE 3

| Sample | Capacity Maintenance Rate After 500 Cycles at 0° C. (%) |
| --- | --- |
| Example 1 | 85 |
| Example 2 | 92 |
| Example 3 | 90 |
| Example 4 | 77 |
| Example 5 | 76 |
| Example 6 | 94 |
| Example 7 | 94 |
| Comparative Example 1 | 60 |
| Comparative Example 2 | 56 |
| Comparative Example 3 | 55 |

As shown in Table 3, the lithium ion battery of Example 1 using 2 mass % of the platy graphite as conductive additives exhibited a capacity maintenance rate of 85%. In contrast, the lithium ion battery of Comparative Example 1 using 2 mass % of the carbon black as conductive additives exhibited a capacity maintenance rate of 60%; it is found that Example 1 provided a better life property by as much as 25% than Comparative Example 1.

In Comparative Examples 1 to 3 in which no platy graphite was used and the carbon black was used as conductive additives, the case of using any additive gave a low value of the capacity maintenance rate. The results of the low-temperature cycle test carried out this time had the same tendency as the results of the high-temperature cycle test, and it is presumed that the effect similar to that in the high-temperature cycle test improved the capacity maintenance rate.

Examples 2 to 5 studied the influence on the capacity maintenance rate by using the compound of the formula (3), the compound of the formula (4), VC and PS, respectively, as the kind of an additive added to the electrolyte solution. As a result, Example 2 in which the compound of the formula (4) was added exhibited a higher capacity maintenance rate of 92% than the cases of the other additives. Similarly, Example 3 in which the compound of the formula (3) was added exhibited a higher capacity maintenance rate of 90% than the cases of the other additives. This result is contrastive to the result of the high-temperature cycle property, and it has been found that in the low-temperature cycle property, the improving effect on the life property by the addition of the compounds of the formulae (3) and (4) was remarkably revealed.

Examples 6 and 7 studied the influence on the capacity maintenance rate by using the compound of the formula (4)+VC, and, the compound of the formula (4)+PS, respectively, as the kind of an additive added to the electrolyte solution. As a result, Examples 6 and 7 exhibited capacity maintenance rates nearly equal to that of Example 2. It is found from these test results that VC or PS was concurrently used with the compound of the formula (4) as additives reductively decomposing at a voltage lower than a reduction voltage of the solvent, resulting in an improving effect on the high-temperature cycle property nearly in an equal level to the case of singly using the compound of the formula (4), due to the synergistic effect of these additives.

Unlike lithium ion batteries whose replacement is assumed after a usage period of one to three years for power sources of mobile devices or the like, large-sized lithium ion batteries for automobiles and power storage systems or the like are anticipated to be utilized at least for 10 years, and preferably for a long period of 15 years. Therefore, not to cause the rapid capacity degradation as described above can be said to be an effect having a high industrial importance. Therefore, the application of the lithium ion battery according to the present invention, for example, as large-sized lithium ion batteries for automobiles and the like, is especially useful.

(Measurement of a Capacity Changing Curve)

For the lithium ion batteries fabricated in Examples 1 and 2 and Comparative Example 1, capacity changing curves were measured. FIG. 2 shows capacity changing curves of the batteries of Examples 1 and 2 and Comparative Example 1 at cell voltages of 1.5 to 3.5 V. FIG. 3 shows capacity changing curves of the batteries of Examples 1 and 2 and Comparative Example 1 at cell voltages of 2.4 to 4.0 V.

It is found from FIG. 2 that Examples 1 and 2 had higher capacity changing rates than Comparative Example 1. The reaction ratio of the reductive decomposition reaction of the additive can be estimated from the capacity changing curve at 2 to 3 V of the lithium ion battery. That is, the reaction ratio can be determined from an area surrounded by the dQ/dV value and the voltage of the abscissa (2 to 3 V) shown in FIG. 2. Calculation of the reaction ratio of the reductive decomposition reaction of the compound of the formula (4) as the additive by using FIG. 2 reveals that about 20% was decomposed.

Paying attention to around 3.2 to 3.4 V of FIG. 3, it is found that Comparative Example 1 developed a clear peak. This peak was caused by the decomposition reaction of the solvent component in the electrolyte solution. Therefore, it is found that in the battery of Comparative Example 1, decomposition of the solvent, which was not desired to decompose, much occurred. It is presumed that if the decomposition reaction of an additive did not occur like in Comparative Example 1, the decomposition reaction of a solvent resultantly occurred nearly at 3.2 V, thereby greatly degrading the life property of a battery as described above.

2. Examples in which an Amorphous Carbon was Used as a Negative Electrode Active Material Example 8

A battery was fabricated as in Example 1, except for using 92 mass % of a massive hard carbon (average particle diameter $D_{50s}$=10 μm) being an amorphous carbon as the negative electrode active material. Here, $D_{50s}/D_{50a}$, being a ratio of an average particle diameter $D_{50s}$ of the massive hard carbon to an average particle diameter $D_{50a}$ of the platy graphite, was 4.

Example 9

A battery was fabricated as in Example 8, except for using a composition of a negative electrode mixture of 4 mass % of the platy graphite (the same as in Example 1), 6 mass % of the PVDF, and 90 mass % of the massive hard carbon (the same as in Example 8).

Example 10

A battery was fabricated as in Example 8, except for using a composition of a negative electrode mixture of 4 mass % of the platy graphite (the same as in Example 1), 2 mass % of the carbon black, 6 mass % of the PVDF, and 88 mass % of the massive hard carbon (the same as in Example 8).

Comparative Example 4

A battery was fabricated as in Example 8, except for using a composition of a negative electrode mixture of 2 mass % of the carbon black, 6 mass % of the PVDF, and 92 mass % of the massive hard carbon (the same as in Example 8).

Comparative Example 5

A battery was fabricated as in Example 8, except for using a composition of a negative electrode mixture of 4 mass % of the carbon black, 6 mass % of the PVDF, and 90 mass % of the massive hard carbon (the same as in Example 8).

(Shapes of the Negative Electrode Active Material and the Conductive Additives, and Confirmation of the Contact State of the Negative Electrode Active Material and the Conductive Additives)

There were confirmed by the SEM (scanning electron microscope) observation that the negative electrode active materials of Examples 8 to 10 had a spherical or massive shape, that the conductive additives had a platy shape, and that part of edge surfaces of the conductive additives contacted with surfaces of the negative electrode active materials.

(Measurement of Capacity Maintenance Rates in the High-Temperature Environment)

For the lithium ion batteries fabricated in Examples 8 to 10 and Comparative Examples 4 and 5, the capacity maintenance rates in the high-temperature environment were measured as in Example 1. The constitution of the negative electrode of each lithium ion battery and the measurement results are shown in Table 4.

TABLE 4

| Sample | Kind of Negative Electrode Active Material | Kind of Platy Graphite Conductive Additives | Content of Platy Graphite Conductive Additives in Negative Electrode Mixture (mass %) | Content of Carbon Black in Negative Electrode Mixture (mass %) | Kind of Additive in Electrolyte Solution | Content of Additive in Electrolyte Solution (mass %) | Capacity Maintenance Rate After 500 Cycles at 55° C. (%) |
|---|---|---|---|---|---|---|---|
| Example 8 | massive hard carbon | platy graphite | 2 | 0 | compound of formula (4) | 2 | 83 |
| Example 9 | massive hard carbon | platy graphite | 4 | 0 | compound of formula (4) | 2 | 85 |
| Example 10 | massive hard carbon | platy graphite | 4 | 2 | compound of formula (4) | 2 | 86 |

TABLE 4-continued

| Sample | Kind of Negative Electrode Active Material | Kind of Platy Graphite Conductive Additives | Content of Platy Graphite Conductive Additives in Negative Electrode Mixture (mass %) | Content of Carbon Black in Negative Electrode Mixture (mass %) | Kind of Additive in Electrolyte Solution | Content of Additive in Electrolyte Solution (mass %) | Capacity Maintenance Rate After 500 Cycles at 55° C. (%) |
|---|---|---|---|---|---|---|---|
| Comparative Example 4 | massive hard carbon | none | 0 | 2 | compound of formula (4) | 2 | 75 |
| Comparative Example 5 | massive hard carbon | none | 0 | 4 | compound of formula (4) | 2 | 76 |

It is found from the results of Table 4 that Examples 8 to 10 using the platy graphite as the conductive additives exhibited higher capacity maintenance rates than Comparative Examples 4 and 5 using the carbon black as the conductive additives.

In addition, example 10 using 4 mass % of the platy graphite and 2 mass % of the carbon black as the conductive additives had a slightly improved higher capacity maintenance rate by 1% in comparison to Example 9 using 4 mass % of the platy graphite as the conductive additives. It is conceivable that the reason is because the compound of the formula (4) added to the electrolyte solution acted not only on the hard carbon being the negative electrode active material but also on the carbon black being the conductive additives, to thereby form good-quality SEI films on surfaces of these materials. It is conceivable that as a result, the reaction resistance of the lithium ion battery decreased and the suppressing effect on the rise in the resistance was caused.

3. Examples in which a Spherical Graphite was Used as the Negative Electrode Active Material

Example 11

A battery was fabricated as in Example 1, except for using a spherical graphite (average particle diameter $D_{50s}$=15 μm) as the negative electrode active material. Here, $D_{50s}/D_{50a}$, being a ratio of an average particle diameter $D_{50s}$ of the spherical graphite to an average particle diameter $D_{50a}$ of the platy graphite, was 6.

Comparative Example 6

A battery was fabricated as in Example 11, except for using 2 mass % of the carbon black as the conductive additives.

(Shapes of the Negative Electrode Active Material and the Conductive Additives, and Confirmation of the Contact State of the Negative Electrode Active Material and the Conductive Additives)

There were confirmed by the SEM (scanning electron microscope) observation that the negative electrode active materials of Example 11 had a spherical or massive shape, that the conductive additives had a platy shape, and that part of edge surfaces of the conductive additives contacted with surfaces of the negative electrode active materials.

(Measurement of Capacity Maintenance Rates in the High-Temperature Environment)

For the lithium ion batteries fabricated in Example 11 and Comparative Example 6, the capacity maintenance rates in the high-temperature environment were measured as in Example 1. The constitution of the negative electrode of each lithium ion battery and the measurement results are shown in Table 5.

TABLE 5

| Sample | Kind of Negative Electrode Active Material | Kind of Platy Graphite Conductive Additives | Content of Platy Graphite Conductive Additives in Negative Electrode Mixture (mass %) | Content of Carbon Black in Negative Electrode Mixture (mass %) | Kind of Additive in Electrolyte Solution | Content of Additive in Electrolyte Solution (mass %) | Capacity Maintenance Rate After 500 Cycles at 55° C. (%) |
|---|---|---|---|---|---|---|---|
| Example 11 | spherical graphite | platy graphite | 2 | 0 | compound of formula (4) | 2 | 70 |
| Comparative Example 6 | spherical graphite | none | 0 | 2 | compound of formula (4) | 2 | 32 |

It is found from the results of Table 5 that Example 11 using the platy graphite as the conductive additives exhibited higher capacity maintenance rates than Comparative Example 6 using the carbon black as the conductive additives. It is conceivable that the reason is because of the similar effect in the case of using the massive graphite as the negative electrode active material. That is, the reason is conceivably because the use of the platy graphite as the conductive additives raised the decomposition efficiency of the compound of the formula (4) being an additive to thereby form good SEI films on surfaces of the negative electrode active material and the like. As a result, the reaction resistance of the lithium ion battery decreased and the suppressing effect on the rise of the resistance was caused.

As described hitherto, it could be confirmed that by making a lithium ion battery having the constitution according to the present invention, the decomposition of the additive in the electrolyte solution was promoted for firm SEI films to be thereby formed on surfaces of the negative electrode active material and the like, and the cycle property excellent at a low temperature and a high temperature was resultantly acquired. It could also be confirmed that particularly the use of a cyclic sulfonate ester or a chain sulfonate ester having two sulfonyl groups as the additive could provide the better cycle property. Such a cycle property excellent at a low temperature and a high temperature is an effect having a very high importance in vehicular or other lithium ion batteries or the like whose daily usage is assumed in cold districts and in a high-temperature environment near the equator.

The present invention has been described by way of exemplary embodiments and Examples, but the present invention is not limited thereto, and various modifications may be made. For example, in the above exemplary embodiments and Examples, descriptions have been made by citing laminate-type large-sized lithium ion batteries as an example; however, the present invention can apply to batteries of a cylindrical type, a coin type, a card type, a flat type, an ellipse type, a square type, a button type and the like.

The present application claims the priority based on Japanese Patent Application No. 2011-155737, filed on Jul. 14, 2011, the disclosure of which is incorporated herein in its entirety.

REFERENCE SIGNS LIST

1 NEGATIVE ELECTRODE
2 PLATY GRAPHITE CONDUCTIVE ADDITIVES
3 NEGATIVE ELECTRODE ACTIVE MATERIAL
4 NEGATIVE ELECTRODE COLLECTOR
5 POSITIVE ELECTRODE ACTIVE MATERIAL
6 POSITIVE ELECTRODE COLLECTOR
7 POSITIVE ELECTRODE
8 SEPARATOR
9 ELECTROLYTE SOLUTION
10 ADDITIVE
11 BINDER
12 CONDUCTIVE ADDITIVES

The invention claimed is:

1. A lithium ion battery comprising:
a negative electrode including a negative electrode active material containing at least one of a graphite and an amorphous carbon, a conductive additive, and a binder;
a nonaqueous electrolyte solution; and
a positive electrode including a positive electrode active material capable of occluding and releasing lithium,
wherein the negative electrode active material has a particulate shape;
the conductive additive comprises a platy graphite with a Raman peak intensity ratio $I_G/I_D$ of 6-12, wherein the $I_G$ is an intensity of a peak in a G band near 1,580 cm$^{-1}$ to 1,600 cm$^{-1}$ corresponding to the in-plane vibration mode and the $I_D$ is an intensity of a peak in a D band near 1360 cm$^{-1}$ derived from in-plane defects, and a thickness of 0.05 μm or larger and less than 0.1 μm,
at least a part of an edge surface of the conductive additive contacts with a surface of the negative electrode active material, and
the nonaqueous electrolyte solution contains a solvent, and an additive which reductively decomposes at a voltage lower than a reduction voltage of the solvent.

2. The lithium ion battery according to claim 1, wherein the nonaqueous electrolyte solution comprises a cyclic sulfonate ester or a chain sulfonate ester including two sulfonyl groups, as the additive.

3. The lithium ion battery according to claim 1, wherein the nonaqueous electrolyte solution comprises a cyclic sulfonate ester including two sulfonyl groups and being represented by the following formula (1), as the additive:

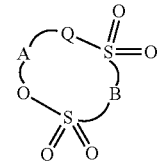

wherein in the formula (1), Q represents an oxygen atom, a methylene group or a single bond; A represents a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms to which an alkylene unit or a fluoroalkylene unit is bonded through an ether bond; and B represents a substituted or unsubstituted alkylene group, a substituted or unsubstituted fluoroalkylene group or an oxygen atom.

4. The lithium ion battery according to claim 1, wherein the nonaqueous electrolyte solution comprises a chain sulfonate ester including two sulfonyl groups and being represented by the following formula (2), as the additive:

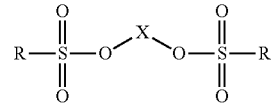

wherein in the formula (2), X represents an alkylene group having 1 to 6 carbon atoms; and R represents an alkyl group having 1 to 6 carbon atoms, and two Rs may be the same group or different groups.

5. The lithium ion battery according to claim 1, wherein $D_{50s}/D_{50a}$, being a ratio of an average particle diameter $D_{50s}$ of the negative electrode active material to an average particle diameter $D_{50a}$ of the conductive additive, is 3 or higher and 10 or lower.

6. The lithium ion battery according to claim 1, wherein a content of the conductive additive in a negative electrode mixture of the negative electrode is 2.0 mass % or higher and 10 mass % or lower.

7. The lithium ion battery according to claim 4, wherein the chain sulfonate represented by the formula (2) is represented by the following formula (3):

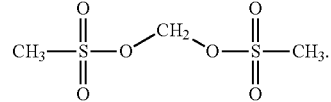

8. The lithium ion battery according to claim 1, wherein a specific surface area of the conductive additive is 10 m$^2$/g or larger and 40 m$^2$/g or smaller.

9. The lithium ion battery according to claim 1, wherein the positive electrode active material comprises manganese spinel (LiMn$_2$O$_4$).

10. The lithium ion battery according to claim 1, wherein the positive electrode active material comprises a carbon black.

* * * * *